United States Patent [19]

Alt

[11] Patent Number: 5,183,445
[45] Date of Patent: Feb. 2, 1993

[54] ARRANGEMENT OF A DIFFERENTIAL FOR DRIVING TWO VEHICLE WHEELS

[75] Inventor: Claus-Christian Alt, Ebersbach-Weiler, Fed. Rep. of Germany

[73] Assignee: Mercedes-Benz AG, Fed. Rep. of Germany

[21] Appl. No.: 820,981

[22] Filed: Jan. 15, 1992

[30] Foreign Application Priority Data

Jan. 18, 1991 [DE] Fed. Rep. of Germany ....... 4101327

[51] Int. Cl.$^5$ ............................................. F16H 57/00
[52] U.S. Cl. .................................. 475/230; 188/82.84; 188/83; 267/141
[58] Field of Search ...................... 475/230; 188/82.84, 188/83; 267/141

[56] References Cited

U.S. PATENT DOCUMENTS

| | | | |
|---|---|---|---|
| 2,129,580 | 9/1938 | Heslep | 475/230 X |
| 2,133,112 | 10/1938 | Ormsby et al. | 475/230 |
| 2,203,292 | 6/1940 | Best | 475/230 X |
| 2,931,464 | 4/1960 | Zwick | 188/83 |
| 4,796,488 | 1/1989 | Hagin et al. | 475/230 |

FOREIGN PATENT DOCUMENTS

| | | |
|---|---|---|
| 1506301 | 4/1978 | European Pat. Off. . |
| 0242348 | 10/1987 | European Pat. Off. . |
| 209938 | 3/1907 | Fed. Rep. of Germany . |
| 1680700 | 4/1971 | Fed. Rep. of Germany . |
| 3034493 | 4/1981 | Fed. Rep. of Germany . |

*Primary Examiner*—Leslie A. Braun
*Assistant Examiner*—William O. Trousdell
*Attorney, Agent, or Firm*—Evenson, Wands, Edwards, Lenahan & McKeown

[57] ABSTRACT

In an arrangement of a differential for driving two vehicle wheels, with an outer casing and a gearbox casing supported by a bearing. Provided on the gearbox casing is an annular face which is concentric in relation to the bearing axis and with which a solid of revolution made of an elastomer material and held on the outer casing is in continuous, concomitantly rotating contact with a small contact pressure.

6 Claims, 2 Drawing Sheets

ARRANGEMENT OF A DIFFERENTIAL FOR DRIVING TWO VEHICLE WHEELS

BACKGROUND AND SUMMARY OF THE INVENTION

The invention relates to an arrangement of a differential for driving two vehicle wheels, in which a gearbox casing of the differential is rotatably mounted in a non-rotating outer casing and a follower made of a non-metallic material and fixed in its position relative to the outer casing by a holding device can be brought into contact under a small contact pressure with an annular face which is fixed relative to the gearbox casing in terms of movement and is concentric to the bearing axis.

In a known arrangement of this type (German Patent Document DOS 3,034,493), a ring gear fixed to the gearbox casing in terms of rotation and concentric to the bearing axis is subjected to axial bending when loaded by the corresponding driving pinion. In order to limit this bending to a defined degree, a stop fixed on the non-rotating axle casing in which the gearbox casing is rotatably mounted interacts with an annular face of the ring gear. In this known arrangement, the follower acts as a distance piece secured on that end of the stop which faces the annular face, being of such a thickness that it rests against the annular face. The distance piece is composed of a material which is abraded due to the contact with the annular face, with the result that a gap corresponding to the thickness of the distance piece is formed between the end of the stop and the annular face of the ring gear, the end of the stop thereafter preventing axial bending of the ring gear beyond the width of the gap.

Despite a considerable manufacturing effort, running noises associated with the toothing occur again and again at rear-axle gear units of passenger vehicles. A great deal of effort is put into preventing the transmission of these noises into the passenger compartment, e.g. by means of the flexible suspension of the rear-axle gear unit in the axle support, and this may well be disadvantageous as regards costs and occurrence of phenomena on the vehicle such as, for example vibration and juddering.

An object on which the invention is based consists essentially in suppressing the above mentioned running noises associated with the toothing.

Starting from an arrangement of a differential of the type referred to above this object is achieved in an advantageous manner by providing a construction wherein the follower is a solid of revolution made of a noise-deadening material rotating concomitantly freely and positioned to be in continuous contact.

In the arrangement of a differential according to the invention, a solid of revolution coated with damping material or composed of this material is pressed under a small load against the ring gear or the gearbox casing so as to rotate freely with it and thus prevents free vibration in a manner comparable, for instance, to the reduction of the noise level brought about by placing a finger on a bell.

The solid of revolution can be accommodated in a cover plate of the outer casing or accommodated in the casing itself.

The contact pressure of the solid of revolution can be determined exclusively by the elastic properties of its material and by the choice of the installation dimensions and the tolerances or by a spring.

A damping force connected in parallel with the spring can additionally be provided for the purpose of providing contact pressure.

The solid of revolution can act either radially or axially on the ring gear or gearbox casing, in relation to the bearing axis of the gearbox casing.

The annular face interacting with the solid of revolution is preferably kept free of oil by means of an oil scraper.

Other objects, advantages and novel features of the present invention will become apparent from the following detailed description of the invention when considered in conjunction with the accompanying drawings.

DETAILED DESCRIPTION OF THE DRAWINGS

Figure 1:
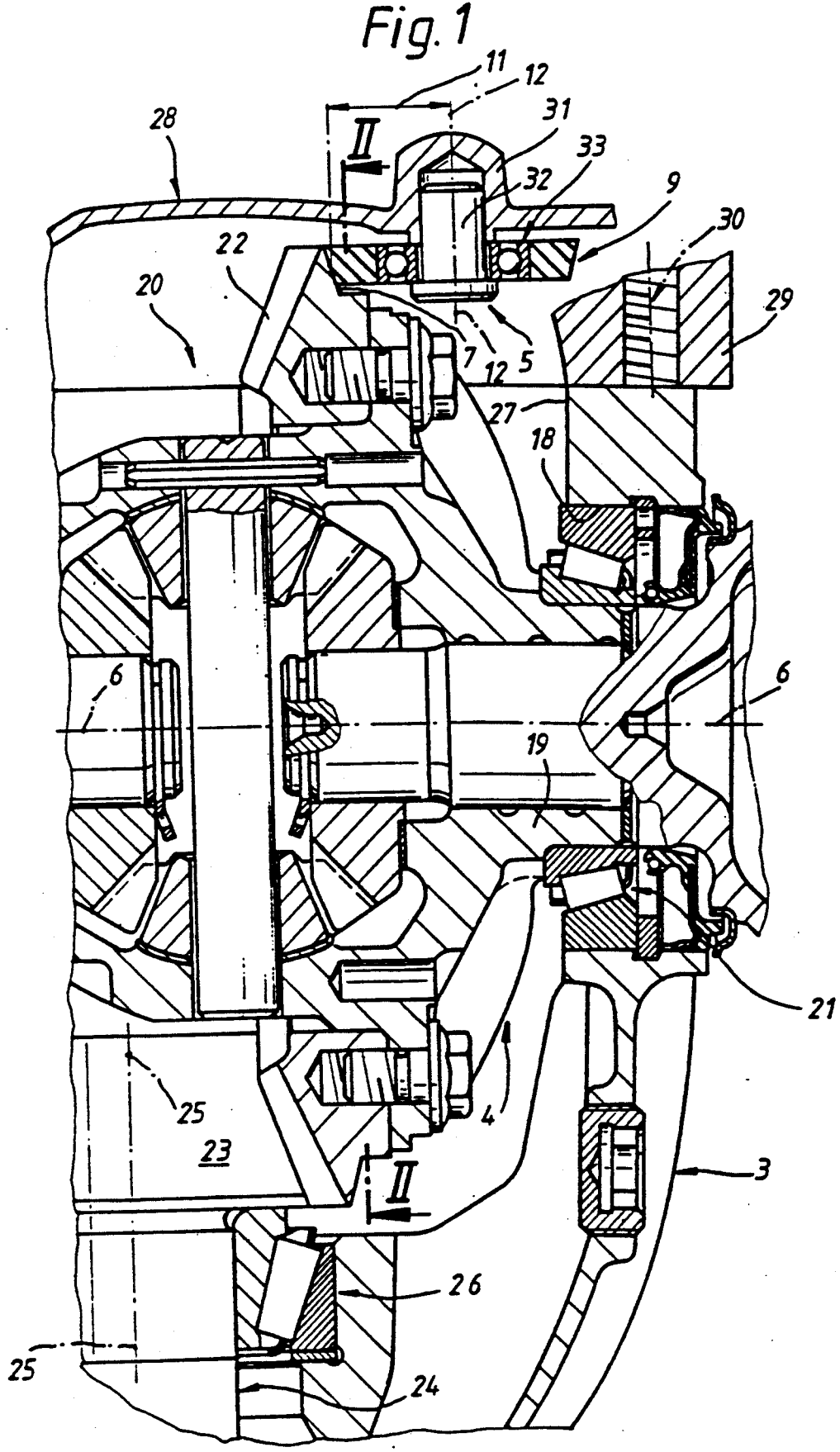
FIG. 1 is a partial sectional schematic view through a first illustrative embodiment of an arrangement of a differential of a rear axle of a motor vehicle according to the invention in a plane containing the bearing axis of the gearbox casing, in accordance with the line I—I in FIG. 2 but rotated by 90°.

Referring to FIG. 1, a non-rotating axle casing 3 of a rear axle of a motor vehicle is provided with two bearing apertures 18, aligned with a bearing axis 6—6, for the rotatable support of in each case one bearing neck 19 of a gearbox casing 4 of a differential 20, in each case by means of a taper roller bearing 21, the partial section reproducing only that bearing side of the arrangement which is associated with the left-hand rear wheel since the other, aligned bearing side can of course be of identical design. The gearbox casing 4 is connected firmly, in terms of rotation, to a ring gear 22 which is centric to the bearing axis 6—6 and meshes with a driving pinion 23, the pinion shaft 24 of which is likewise supported in the axle casing 3—with its axis 25—25 of rotation lying perpendicular to the bearing axis 6—6—by means of taper roller bearings 26.

For the introduction of the differential 20, the rear end of the axle casing 3 has a wide assembly aperture 27, which is closed by a casing cover 28, which is secured by its rim 29 on the axle casing 3 at 30.

At its rear side facing away from the driving pinion 23, the ring gear 22 is provided with an annular face 7 which is centric to the bearing axis 6—6 and with which the outer lateral surface of an annular solid of revolution 9 is in constant contact under slight contact pressure. In relation to its axis 12—12 of rotation, the solid of revolution 9 is fixed relative to the axle casing 3 by a holding device 5. In this embodiment, the holding device 5 essentially consists of a bearing journal 32 inserted in a fixed manner in an associated bearing lug 31 of the casing cover 28 and on which the solid of revolution 9 is rotatable by means of a rolling bearing 33 but essentially fixed in terms of movement in the directions of the axis 12—12 of rotation. Thus, when the ring gear 22 is driven, the solid of revolution 9 rotates continuously along with it and, due to the damping properties of its elastomer material, suppresses the noises which derive from the tooth engagement between ring gear 22 and driving pinion 23. In this illustrative embodiment, the contact pressure between annular face 7 and solid of revolution 9 is essentially determined by the elasticity of the material, by the spacing 11 between the axis 12—12 of rotation of the solid of revolution 9 and the annular face 7 when installed, and by tolerances.

Figure 2:
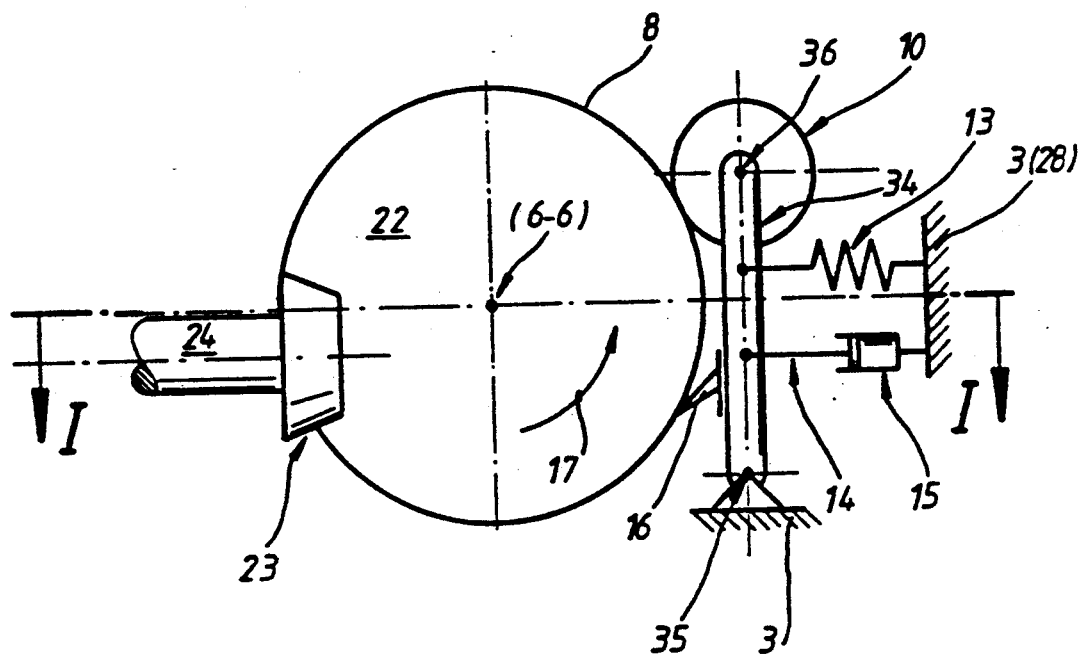
FIG. 2 a basic schematic representation of a second illustrative embodiment of an arrangement of a differential of a rear axle of a motor vehicle according to the invention in the manner of a partial section in a plane corresponding to the line II—II in FIG. 1 and perpendicular to the bearing axis of the gearbox casing.

In the illustrative embodiment of FIG. 2, the differential and its mounting in the axle casing 3 and its drive via ring gear 22 and driving pinion 23 are identical to the first illustrative embodiment of FIG. 1.

Whereas, in the first illustrative embodiment, the contact forces of the solid of revolution 9 act essentially in the axial direction—i.e. in the direction of the bearing axis 6—6—, in the second illustrative embodiment a solid of revolution 10 exerts radial contact forces in relation to the bearing axis 6—6 on a concentric annular face 8 of the ring gear 22. In this case, the contact forces are determined by resilient means 13 and damping means 15 connected in parallel with the resilient means, of a holding device 14 for fixing the solid of revolution 10 in relation to the axle casing 3 or casing cover 28. For this purpose, the holding device 14 has a bracket 34, which is articulated at one end on the axle casing 3 by means of a swivel bearing 35 and, at its other end, holds the solid of revolution 10 rotatably in a bearing 36. Resilient means 13 and damping means 15 are thus inserted between bracket 34 and axle casing 3. The annular face 8 is cleaned by an oil scraper 16 which is arranged in front of the solid of resolution 10 in relation to the direction 17 of rotation of the ring gear 22 which corresponds to forward driving, the solid of revolution 10 likewise being composed of an elastomer material for purposes of damping.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Arrangement of a differential for driving two vehicle wheels, in which a gearbox casing having a bearing axis of the differential is rotably mounted in a non-rotating outer casing and a follower made of a non-metallic material and fixed in its position relative to the outer casing by a holding device can be brought into contact under a small contact pressure with an annular face of a ring gear which is fixed relative to the gearbox casing in terms of movement and is concentric to the bearing axis, wherein the follower is a solid of revolution made of a noise-deadening material rotating concomitantly with said ring gear and freely positioned to be in continuous contact with said ring gear.

2. Arrangement according to claim 1, wherein the contact pressure is determined essentially by the elasticity of the solid of revolution and the spacing of the axis of rotation of the solid of revolution relative to the annular face.

3. Arrangement according to claim 1, wherein the holding device includes a resilient device, the contact pressure being determined by the resilient device.

4. Arrangement according to claim 3, wherein a damping device is connected in parallel with the resilient device.

5. Arrangement according to claim 1, wherein an oil scraper is provided which interacts with the annular face and is arranged in front of the solid of revolution in relation to the direction of rotation of the gearbox casing which corresponds to forward driving.

6. Arrangement of a differential for driving two vehicle wheels, in which a gearbox casing having a bearing axis is rotatably mounted in a non-rotating outer casing and a follower made of a non-metallic material and fixed in its position relative to the outer casing by a holding device can be brought into contact under a small contact pressure with an annular face of a ring gear driven by a pinion, the ring gear being fixed relative to the gearbox casing in terms of movement and is concentric to the bearing axis, wherein the follower is a solid of revolution made of a noise-deadening material rotating concomitantly with said ring gear and freely positioned to be in continuous contact with said rind gear at a position on said ring gear rotated at least 90° from said pinion.

* * * * *